United States Patent
Behnke et al.

(10) Patent No.: US 7,001,267 B2
(45) Date of Patent: Feb. 21, 2006

(54) METHOD OF CONTROLLING A THRESHING MECHANISM OF A COMBINE HARVESTER

(75) Inventors: Willi Behnke, Steinhagen (DE); Martin Dammann, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/869,240

(22) Filed: Jun. 16, 2004

(65) Prior Publication Data

US 2004/0259610 A1 Dec. 23, 2004

(30) Foreign Application Priority Data

Jun. 18, 2003 (DE) ................................ 103 27 758

(51) Int. Cl.
*A01D 75/18* (2006.01)
*A01F 12/16* (2006.01)
*A01F 21/00* (2006.01)

(52) U.S. Cl. ............................................. 460/6; 460/7
(58) Field of Classification Search .................... 460/1, 460/4, 5, 6; 56/10.2 R, 10.2 C; 701/50; 382/156
See application file for complete search history.

(56) References Cited

U.S. PATENT DOCUMENTS

| 4,337,611 A | * | 7/1982 | Mailander et al. ............. 460/7 |
| 4,527,241 A | * | 7/1985 | Sheehan et al. ............... 701/50 |
| 5,488,817 A | * | 2/1996 | Paquet et al. ............. 56/10.2 R |
| 5,666,793 A | * | 9/1997 | Bottinger ................... 56/10.2 R |
| 6,205,384 B1 | | 3/2001 | Diekhans |
| 6,315,658 B1 | * | 11/2001 | Weber ........................... 460/6 |
| 6,475,081 B1 | * | 11/2002 | Coers et al. ................... 460/7 |
| 6,553,300 B1 | * | 4/2003 | Ma et al. ...................... 701/50 |
| 6,726,559 B1 | * | 4/2004 | Bischoff ........................ 460/1 |
| 6,761,630 B1 | * | 7/2004 | Schwinn et al. ............. 460/101 |
| 2003/0110748 A1 | * | 6/2003 | Coers et al. .............. 56/10.2 G |

FOREIGN PATENT DOCUMENTS

| DE | 198 00 238 C1 | 8/1999 |
| EP | 1 095 262 B1 | 5/2001 |

* cited by examiner

*Primary Examiner*—Árpád Fábián Kovács
(74) *Attorney, Agent, or Firm*—Michael J. Striker

(57) ABSTRACT

For controlling a threshing mechanism of a combine harvester parameters of the threshing mechanism are adjusted with respect to a nominal crop throughput determined for corresponding harvesting conditions to an optimal value, the changing automatically and the adjustment includes automatically determining a deviation of an actual crop throughput from the nominal crop throughput, and adjusting at least one threshing mechanism parameter for adaptation to the actual crop throughput; also a combine harvester with the control device for performing the method is proposed.

19 Claims, 3 Drawing Sheets

METHOD OF CONTROLLING A THRESHING MECHANISM OF A COMBINE HARVESTER

BACKGROUND OF THE INVENTION

The present invention relates to a method of controlling a threshing mechanism of a combine harvester.

More particularly, it relates to such a method of controlling, in accordance with which the predetermined parameters of the threshing mechanism are adjusted with regard to a nominal crop performance determined for predetermined harvesting conditions, to an optimal value.

Moreover, the present invention also relates to a combine harvester provided with a control arrangement for performing such a method.

Combine harvesters are provided with various working aggregates for treatment of the harvested product stream. Important working aggregates include for example a threshing mechanism for threshing a product stream from which grains have to be removed, a separating device which is located after the threshing mechanism and formed for example as a shaker or a rotor for separating the grains contained in the threshed product stream from further components of the threshed product stream, and the cleaning device composed as a rule of several sieves and a fan for separating the grains from admixtures, such as chaff and short straw. Different parameters of this working aggregates, for example the threshing concave distance and the threshing drum rotary speed of the threshing mechanism or the fan power and the sieve widths of the cleaning device must be adjusted in dependence on the corresponding crop and other harvest conditions, in order to perform a planned harvesting work in an optimal manner.

In connection with this, different objectives can be set in these cases. One of these objectives is to obtain a smallest possible loss rate. A further objective is that, due to the high time pressure, to obtain within the short harvesting period a high throughput or a high surface performance, or in other words to provide harvesting in the shortest possible time. Unfortunately these objectives are not independent from one another, but instead with increasing crop throughput, generally the losses increase as well. The common objective is therefore to obtain a compromise between a still acceptable loss rate and a fast carrying out of the harvesting work.

Due to different properties of the different crop or fruit types, as well as different harvesting conditions such as ripening condition of the crop, grain moisture, straw content, straw moisture, grain size, components density, etc. it is often not simple for a driving operator to adjust all parameters of the working units of the combine harvester. In modern combine harvesters with comfortable control devices, the adjusting values are supplied from a storage device or from a table, which were identified before from test results of the manufacturer of the combine harvester or the operator of the combine harvester.

A method, in which the adjustment parameters for the working units of the combine harvester with inputting a crop type and further crop-specific values as well as the objectives for the planned harvesting work can be obtained from a storage device, is disclosed for example in the German patent document DE 198 00 238 C1. The working units of the combine harvester are adjusted to such optimal values, with which a justifiable loss value can be obtained with the introduced harvesting conditions, in other words the crop properties and other conditions such as ground property, moisture, etc. By means of these adjustments the desired objective is obtained when the combine harvester operates in the most efficient way with a justifiable harvest loss. The driver has only the task to select the harvesting speed, or in other words the traveling speed of the combine harvester, so that actually the predetermined nominal crop throughput is maintained, with respect to which the parameters of the working units are adjusted to the optimal value.

Unfortunately, however the targeted optimal nominal crop throughput can not be always maintained, since suddenly occurring restricting harvesting conditions do not allow the required harvesting speed. Such restricting outer harvesting conditions include for example a so-called down grain, product flow problems in the cutting mechanism, rocky regions in the ground, strong ground unevenness or an overloading of the crop during the travel. Also, with a too careful driver, it can be prevented that the targeted crop throughput is reached. The restrictive harvesting conditions based on the crop itself, or in other words the restricted crop properties include for example a very high straw and/or grain moisture or weeds in the crop stock. The driver is then forced to reduce the harvesting speed. Also, outer harvesting additions can lead to the situation that the driver must suddenly increase the harvesting speed, for example when there is a risk that the weather changes and a predetermined field part must be definitely harvested before it. All these cases lead to the situation that the concrete actual crop throughput deviates from the nominal crop throughput, with respect to the optimal adjustment of the machine parameters.

Each significant deviation of the crop throughput from nominal crop throughput is however disadvantageous, depending on whether it deals with too low or too high crop throughput. When mainly the actual crop throughput is lower than the nominal crop throughput this can lead to the situation that the threshing device of the combine harvester thrashes very small crop quantity too strongly. As a result, many grains are broken in the threshing device (so-called "grain breakage"). The damaged grains can not be used anymore, so that the loss rate is increased. Furthermore, with the too hard threshing, the straw is unnecessarily comminuted in the threshing device and moves then through the threshing concave or through the subsequent separating device into the cleaning device. This leads to an increased cleaning load and a reduced cleaning efficiency. Moreover, it is connected with very high energy use. The different crop properties can further lead to overloading of individual working units, for example the separation rotors, a straw chopper or the drive motor. Very high crop throughput to the contrary leads to the situation that the crop is no longer correctly threshed in the threshing device. The not threshed grains can not be then separated in the subsequent separating device from straw, so that an increased number of grains remains in the straw and thereby the loss rate also increases.

In order to avoid this, in the known method in the case of occurrence of such restrictive harvesting conditions, a completely new optimization of the required adjustment parameters of the working units of the combine harvester is performed. It should be considered mentioned that the majority of restricting harvesting conditions such as for example a down grain, product flow problems, ground unevenness, a crop overloading during the travel or also an increased weed content in the crop, often occur only temporarily or locally within the surface to be harvested. New adjustments of the different parameters are therefore proposed continuously to the driver of the combine harvester during a harvesting work, that additionally burdens the driver and additionally distracts him from the important task to adjust the traveling speed to the outer conditions and to reach the optimal harvesting speed as fast as possible.

SUMMARY OF THE INVENTION

Accordingly, it is an object of the present invention to provide a method of controlling and a corresponding combine harvester, which allow a fast and simple automatic reaction to the occurrence of restrictive harvesting conditions.

In keeping with these objects and with others which will become apparent hereinafter, one feature of the present invention resides, briefly stated in a method of the above mentioned general type in which automatically a deviation of the actual crop throughput from a nominal crop throughput is recognized, and at least one threshing mechanism parameter is adjusted with adaptation of the actual crop throughput.

In accordance with the invention, it is automatically registered that a suboptimal working capacity of the threshing mechanism takes place and the threshing mechanism is adapted to this situation by temporary de-adjustment by the optimal value determined for the optimal nominal crop throughput. In this way, for example it can be prevented that with a sudden reduction of the crop throughput, the too small crop quantity is threshed very strongly, or in the case of a suddenly occurring, especially high crop throughput the crop quantity is threshed insufficiently. Grain or straw breakage, an excessive loss of crop as well as unnecessary wear and consumption of the operational materials can be thereby avoided. Such a fully automatic adjustment of the threshing mechanism parameters can be provided very fast, so that the reaction can immediately follow the change in the crop throughput.

For performing the inventive method, a combine harvester provided with a conventional threshing mechanism needs a control device, for adjusting predetermined parameters in the threshing mechanism to the optimal value with reference to a nominal crop throughput determined for predetermined harvesting conditions. In accordance with the present invention, this control device must have a corn throughput control device which automatically recognizes the deviation of the actual crop throughput from a nominal crop throughput, and must be designed so that in the case of such a deviation it adjusts at least one threshing mechanism parameter for adaptation to the actual crop throughput.

The most important parameters of the threshing mechanism which can be adjusted for adaptation to the actual corn throughput are the threshing drum rotary speed and the threshing concave distance. The distance of the threshing concave from the threshing drum is identified as a so-called threshing gap. It is possible both to adjust only one of these parameters, and also simultaneously two parameters. Preferably, with reducing crop throughput the threshing drum rotary speed is reduced and in some cases additionally to the reduction of the threshing drum rotary speed, the threshing concave distance is also reduced.

It is especially advantageous to adjust the threshing concave distance in accordance with a predetermined function in dependence on the actual threshing drum rotary speed. Furthermore, it is especially advantageous to adjust the threshing drum rotary speed and/or the threshing concave distance in dependence on a crop property. Such a crop property is such that for example, as far as the friction within the threshing process is needed, it obtains an objectionable threshing action. For example, for predetermined grain types, a predetermined basic friction inside the threshing gap is necessary. Other crops are to the contrary independent from the friction so that here the concave distance has only a small influence of the threshing action. Correspondingly, it is recommended when the function of the threshing concave distance to be adjusted in dependence on the actual threshing drum rotary speed is also selected in dependence on the grain type or the crop type. In this way, by the adjustment of only two threshing mechanism parameters an optimal adaptation to the deviation of the crop throughput from the nominal crop throughput is achieved. Thereby, the negative effects which occur by a deviation from the optimal nominal crop throughput can be very simply continuously reduced.

For avoiding an overreaction of the automatic control in the case of only insignificant or limited-in-time deviations from the nominal crop throughput, a threshing mechanism parameter is first preferably adjusted when the actual crop throughput deviates from the nominal crop throughput by a predetermined threshold value and/or a predetermined first time period.

It is especially advantageous to adjust an adjustable threshing mechanism parameter automatically again back to the optimal value when the actual crop throughput again corresponds to the nominal crop throughput or deviates less than a predetermined threshold value from the nominal crop throughput. Moreover, it is especially advantageous when after the elapse of a predetermined second time period in which the nominal crop throughput is not reached or the actual crop throughput deviates by more than a predetermined threshold value, to perform automatically a complete new adjustment of the adjustable parameter of the working units of the combine harvester or in other words to inform the driver that this parameter must be again adjusted optimally, wherein the actual crop throughput is taken as a new nominal crop throughput.

This method has the advantage that in the case of only temporary restrictive harvesting conditions in which the driver must reduce or increase the speed for a relatively short time, a complete adjustment of the machine parameters and thereby resulting expenses for the machine and the driver are avoided. Instead, a fast adaptation of the threshing mechanism to the restrictive harvesting conditions and also automatically a back adjustment to the optimal value are performed, when the conditions are again optimal. Only in the cases, in which it is determined that the harvesting conditions changed basically, a suitable new-optimization of the machine parameters is performed.

For determining the actual crop throughput or the deviation of the crop throughput from the nominal crop throughput different possibilities are provided.

For measuring the actual total crop directly in a crop feed of the combine harvester, a corresponding sensor device is arranged there. The sensor device can be for example a sensor in a feed rake of the combine harvester, which determines the crop layer height. Alternatively, also other sensors can be used, for example light barriers or the like.

Furthermore, at the output of the separating device and/or at the output of the cleaning device, loss quantity sensors can be arranged, for determining the loss quantities which occur there. This loss quantity is for example a measure for the loading of the corresponding device and thereby a measure for the deviations of the actual crop throughput from the nominal crop throughput. Baffle plates with knock sensors can be used for example as the loss quantity sensors.

A further possibility is that the breakage grain portion can be determined and in accordance with this breakage grain portion, the deviation of the actual crop throughput from the nominal crop throughput can be determined. A breakage corn sensor device is disclosed for example in the European patent document EP 1 095 262 B1.

Furthermore, a deviation of the actual crop throughput from the nominal crop throughput can be determined by measuring a rotary movement on a drive shaft, for example of the threshing drum of the accelerating drum which is located before the threshing mechanism, or of the beater drum which is located after the threshing mechanism, and/or by measuring a driven moment of a drive motor.

Preferably, the measuring values of several different sensors are utilized, and then from the measuring data the working capacity of the harvester thresher, or in other words the deviation of the crop throughput from the nominal crop throughput can be determined.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
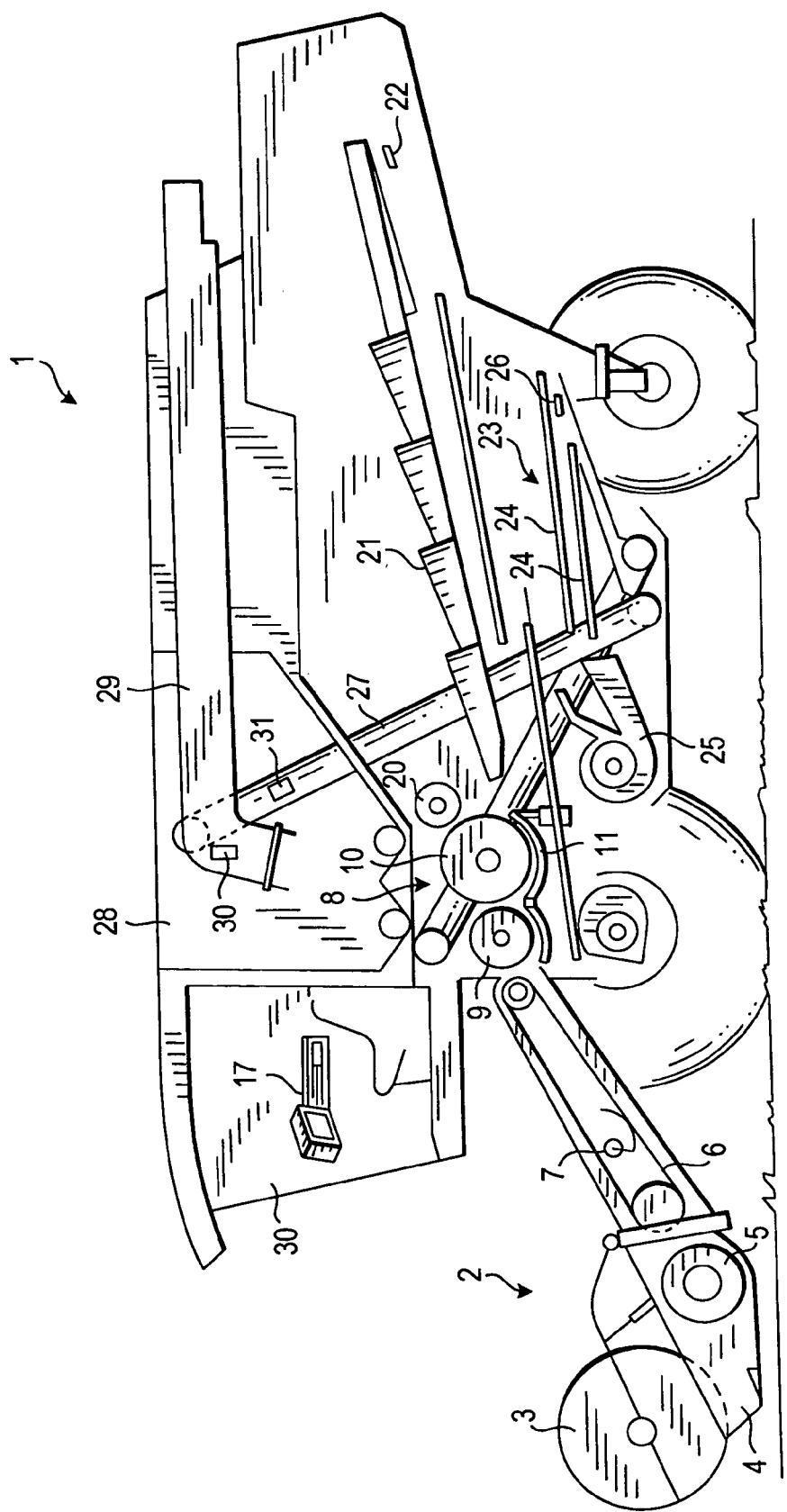
FIG. 1 is a view schematically showing a cross-section through a combine harvester.

As an example of the present invention, a self-propelling combine harvester is shown in FIG. 1 and identified with reference numeral 1. It has a so-called tangential or also a transverse flow threshing mechanism 8, and a shaker 21 arranged behind and operating as a separating device. The shaker 21 is formed as a hurdle shaker provided with several shaker traveling stages. Under the shaker 21, a cleaning device 23 is located. It is includes several sieves 24 which are arranged over one another, and also a fan 25. The invention of course is not limited to the combine harvester of this specific type.

The combine harvester 1 in accordance with the present invention operates in the following manner.

The crop is first inclined by a reel 3 of the mowing table 2 in direction of a mowing direction 4 and cut by the mowing knives. The crop is then transported through a feed anger 5 and an inclined conveyor into a feed passage 6 to the inlet of the threshing mechanism 8.

A feed or preacceleration drum 9 is located at the inlet of the threshing mechanism 8, and a threshing drum 10 is located behind in a product flow direction with a rotary axis extending transversely to the product flow direction, or in other words transversely to the longitudinal axis of the combine harvester.

A correspondingly shaped threshing concave 11 is located under the threshing drum 10. Such a threshing concave 11 is composed conventionally of a plurality of ribs which are bent semicircularly in the circumferential direction of the threshing drum 10 and arranged at a distance from one another. They are connected by a plurality of webs which extend parallel and transversely to them.

The threshing drum 10 on its outer radius is provided with so-called threshing strips which are not shown in the drawings. The crop which comes out of the feed passage 6 is engaged by the preacceleration drum 9 and then put further by the threshing drum 10 through a threshing gap provided between the threshing drum 10 and the threshing concave 11. The crop is threshed by the threshing strips, or in other words is stricken and/or crushed, so that a corn-chaff mixture falls downwardly through the threshing concave 11. It is then supplied to the cleaning device 23 for separating the grains for the admixtures or in other words from stalk and chaff parts.

The threshed product stream is deviated from the threshing mechanism 8 over the beater drum 14 to the hurdle shaker 21, which separates the gains located in the product stream and also eventually short straw and shaft. The grains, the short straw and the shaft are supplies in the cleaning device 23, in which the grains are separated from the short straw and shaft. This is performed so that through the sieve openings (openings, mesh, slots) in the sieves 24, by means of the fan 28, wind is blown to loosen the crop which is guided over the sieves 24 and to separate the specific lighter chaff and short straw fraction, while the heavier crop grains fall through the sieve openings. The sieves 24 are arranged partially over one another, so that the crop in different sieves are finely sieved in a different manner. The grains which travel through all sieves 24 of the cleaning device 23 fall onto the catching and guiding bottom and are supplied to a grain feed auger. They are transported by an elevator 27 into a grain tank 28 of the combine harvester 1, and when needed can be reloaded by a grain emptying conveyor 29 to a transporting car. The particles which move in the cleaning device 23 on the upper sieve 24 to the rear end, as a rule are the heavier particles, or in other words such particles which contain a grain, with the grain being completely released from other components. This fraction can be supplied to a further elevator as a so-called reverse, again back to the threshing mechanism 8.

The components which did not fall through the upper sieve 24 are thrown out as loss. Also, the straw and a certain percentage of loss grains travels over the hurdle shaker 21 to the rear end of the combine harvester and are discharged there.

The combine harvester 1 at different points have different sensing devices 7, 22, 26, 30, 31. These devices include a sensor 7 in the feed passage 6 which can directly measure the layer height H of the crop in the feed passage 6 and thereby the crop throughput. Further sensor devices include baffle plates with knock sensors 22, 26 located at the rear end under the further shaker 21 and at the rear end under the upper sieve 24 of the cleaning device 23. Moreover, the combine harvester has additional sensor devices in the grain tank at the output of the elevator 27, formed as a grain breakage detector 30 which recognizes damaged or in other words broken gains, and a yield measuring device 31 arranged in the corn elevator 27 and determining the grain quantity.

All these grain devices 7, 22, 26, 30, 31 are connected with a control device 15. A user interface 17, for example with a display 18 and various keys 19, is also connected to the control device 15. It is operatable or programmable by a driver of the control device 15. The user interface 17 is located inside the driver's cabin 30. With the user interface 17, the driver can, for example, preselect the harvesting conditions and the crop, and can adjust optimal nominal crop throughput and the associated optimal machine parameters on the machine set on the machine predetermined, optimal parameters on the machine.

Figure 2:
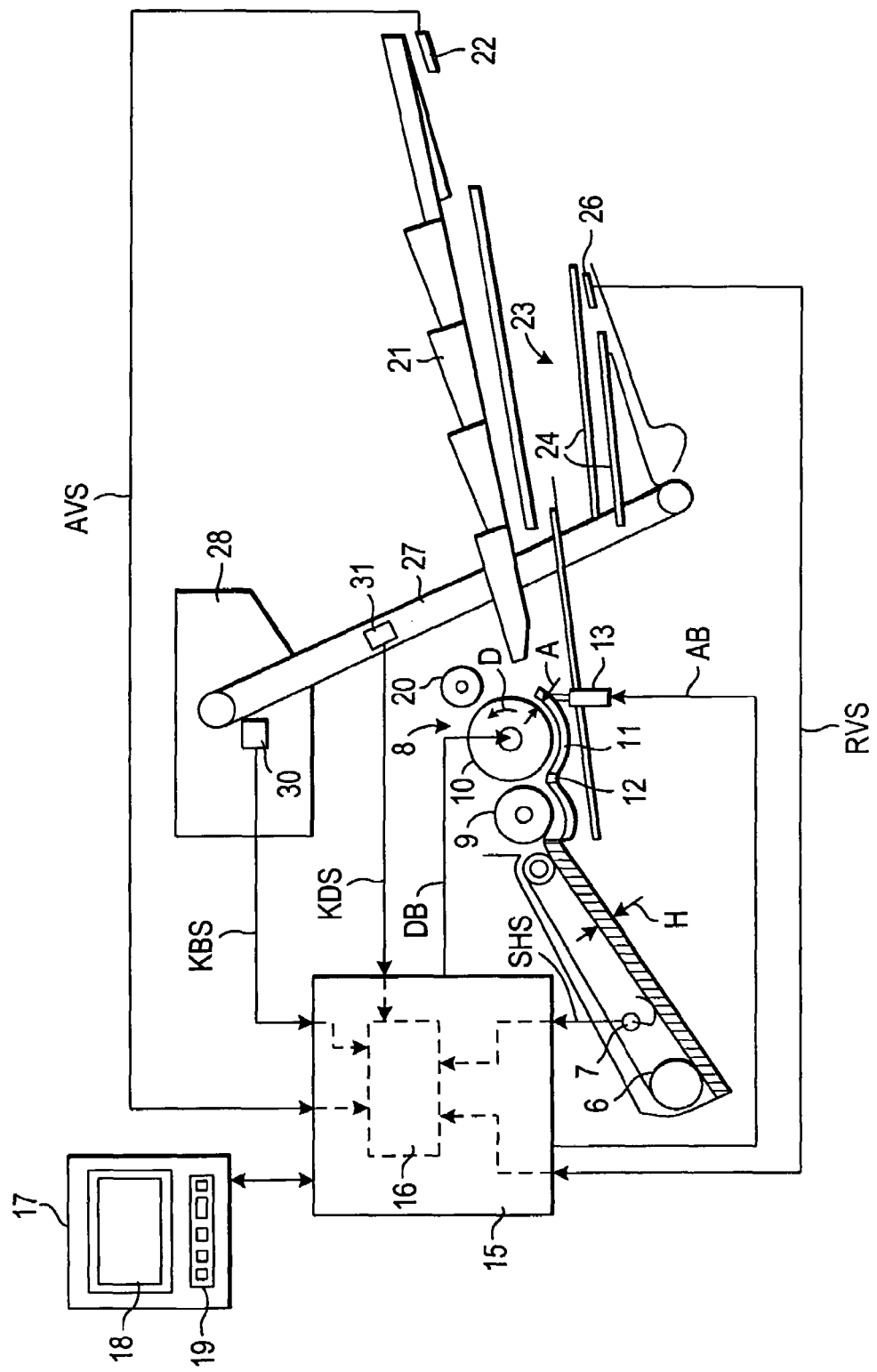
FIG. 2 is an enlarged view of a feed passage, a threshing mechanism, a separating device, a cleaning device and an elevator to a grain tank of the combine harvester of FIG. 1, including sensing devices and the inventive control.

The connection of the individual sensor devices 7, 22, 26, 30, 31 and the user interface 17 with the control device 15 is not shown in FIG. 1 for simplicity of the illustration. Instead, a substantially detailed showing is provided in FIG. 2, for which the reference is made for further clarifications.

The signal SHS obtained by the sensor 7 in the feed passage 6 is directly proportional to the layer height H in the feed passage 6 and thereby proportional to the crop throughput. The signal AVS produced by the knock sensor 22 at the rear end of the separating device 21 is substantially proportional to losses occurring at the separating device 21. Also, the signal RVS of the sensor 26 in the cleaning device 23 is a measure for the grain losses at the cleaning device 23.

These three signals SHS, AVS, RVS, as well as the signal KBS produced by the corn breakage detector device 30 and the signal KDS of the yield measuring device 31, are supplied to a crop throughput control unit 16 of the control device 15. The control device 15 is schematically shown as a block, in which the crop throughput control unit 16 is integrated. The control device 15 in a conventional manner can be composed of hardware and/or software components. As a rule, the control device 15 includes a processor or several processors which are interconnected with one another, with which corresponding software for controlling the individual components and for evaluating the measuring signals is implemented. Through suitable interfaces, the control device can receive the signals SHS, AVS, RVS, KBS, KDS and produce control command AB, DB. The crop throughput control unit 16, as shown, can be formed as a sub-module inside the control device 15. Basically, this part of the control device can be also formed separately from the remaining components of the control device. These components required for the invention can be placed on an electronic hardware and software platform which is available in a combine harvester, for example the electronic board information system CEBIS, of the CLAAS company.

The crop throughput control unit 16 evaluates the signals EDS, RVS, AVS, KDS, KBS available from the individual sensors 4, 22, 26, 30, 31 and determines from one of the signals or from a combination of the signals, for example in connection with the ratio between two signals, the deviation of the actual crop throughput from the optimal nominal crop throughput, for which the machine parameters can be optimized.

A simplest possibility resides in drawing the signal EDS transmitted from the layer height sensor 7 in the crop feed 6, as a measure from the actual crop throughput.

It is also possible to use the losses at the separating device 21 and/or the cleaning device 23 as a measure for the deviations from the nominal crop throughput. It should be considered for this purpose that normally with the same adjustment of the threshing mechanism 8, the loss increases proportionally to the throughput, since with increasing crop quantity the separating device 21 is loaded more. Thereby as a rule with a lowering of the crop throughput the separating loss signal AVS of the sensor 22 located at the end of the separating device 21 also lowers. Simultaneously with lowering crop throughput and the same adjustment of the threshing mechanism 8, the corn breakage portion increases, which is reflected in the corn breakage signal KBS of the corn breakage detector 30, so that this signal KBS in particular in combination with the separating loss signal AVS can be drawn to register a deviation of the actual crop throughput from the nominal crop throughput downwardly.

When the crop throughput increases over the nominal crop throughput, this means that the optimal threshing drum rotary speed D is no longer reached and the grains are no longer properly released from the spikes. Thereby the cleaning loading is increased, so that the cleaning loss signal RVS of the loss sensor 26 in the cleaning device 23 increases. A further indication of whether the threshing drum rotary speed D is too low for the actual total throughput is the ratio between the total crop throughput and the grain throughput.

It should be mentioned that in the inventive combine harvester, all these sensors must not be necessarily utilized. In the simplest case, the invention can be realized for example with only one layer height sensor 7 in the crop feed 6. Since the majority of the modern combine harvesters are provided with the various sensors, it is however recommended to evaluate all available measuring signals in the crop throughput control device for providing the most speedy and reliable diagnosis.

Depending on the deviations of the crop throughput determined by the crop throughput control unit 16 from the nominal crop throughput, the threshing mechanism 8 is controlled correspondingly. For this purpose the control device 14 can provide a rotary speed command DB to a not shown variator for increasing or reducing the threshing drum the rotary speed D. Moreover, the control device 15 can adjust with a distance command AB an adjusting member 13 which is arranged at the rear end, or in other words at the product outlet of the threshing concave 11, so that the threshing concave 11, which turnably mounted about a turning axis 12 at its front end in a product flow direction, can be turned in a desired manner relative to the threshing drum 10.

The degree to which the threshing drum rotary speed D and the threshing concave distance A must be adjusted correspondingly to react to the deviations of the crop throughput from the nominal crop throughput is predetermined by the functions which are stored in a not shown storage unit of the control device 15.

Figure 3:
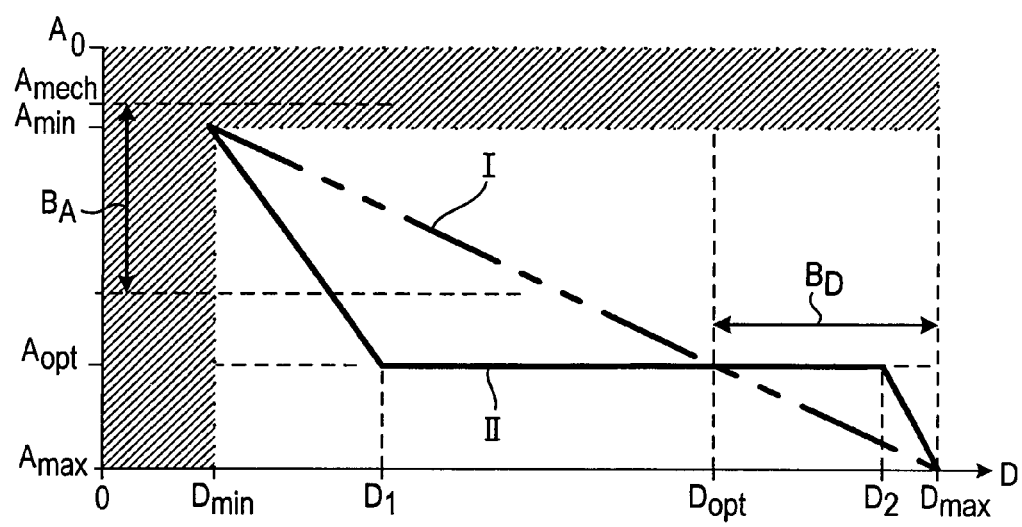
FIG. 3 is a graphic illustration of two functions for adjustment of a threshing concave distance depending on an actual threshing drum rotary speed.

FIG. 3 shows as an example two functions I, II, with which it is predetermined how the concave distance A is adjusted with a predetermined threshing drum rotary speed. The threshing concave distance A is plotted over the threshing drum rotary speed D. The threshing drum rotary speed is adjustable between the extreme points $D_{min}$ as a minimum threshing drum rotary speed and $D_{max}$ as a maximum threshing drum rotary speed. The threshing concave distance A can be adjusted between the maximum threshing concave distance $A_{max}$ and a minimum threshing concave distance $A_{min}$. The outwardly located, hatched region is a prohibited region. The minimal threshing concave distance A is located over the mechanically possible threshing concave distance $A_{mech}$, with which the threshing concave 11 would directly abut against the threshing drum 10. Furthermore, two regions $B_A$ and $B_B$ are shown, in which the grain breakage danger is increased because of a very low concave distance A or a very high rotary speed D.

The optimal threshing drum rotary speed $D_{OPT}$ and the optimal threshing concave distance $A_{OPT}$ must be adjusted with the predetermined nominal crop throughput.

When the crop throughput deviates from the nominal crop throughput, with respect to which the optimal values $A_{OPT}$ and $D_{OPT}$ are selected, then correspondingly the deviations of the threshing drum rotary speed and/or the threshing concave distance A is reduced or increased. In both curves I, II with lowering crop throughput continuously the drum rotary speed D decreases, and with increasing crop throughput the threshing drum rotary speed D increases, whereby naturally the corresponding limiting values $D_{MAX}$, $D_{MIN}$ must be taken into consideration.

Both curves 1, 2 therefore show two different possibilities, in accordance with which the adjustment of the rotary concave distance A can be performed in dependence on the selected threshing drum rotary speed D and thereby in dependence from the deviations of the crop throughput from the nominal crop throughput. It should be taken into consideration that the threshing process can be subdivided into two important steps in a simplified manner. The first step is the loosening of the grains from the spikes. This step is influenced substantially by the threshing drum rotary speed D. The baffle strips of the threshing drum 10 hit more or less strongly the straw mat and release the grains from the spikes. This step has the side effect, that due to the acceleration, the grains can be damaged, or in other words the grain breakage can occur. The second step is the degraining or dehusking. This step is substantially performed by the frictional action in the straw mat. The frictional influence is, to the contrary, significantly influenced by the concave distance A. It should be mentioned that a too narrow concave can lead to grain damages.

Curve I is applicable for grains, in which the concave distance A has a great influence on the threshing process. They include such grains, in which it is required to provide friction over a relatively narrow concave adjustment, such as for example barley, in which the awns are removed by friction. In such crop types, the complete distance A must continuously reduce with reducing crop throughput, or in other words the concave distance A is adjusted to the height H of the crop mat, to maintain the basic friction.

For other crop types, such as for example ripe wheat, in which the grains are removed substantially by striking the threshing drum strips against the crop mat from the spikes, a degraining as a rule is not necessary. For these crop types it is sufficient to adjust, with constant concave distance 8, the threshing drum rotary speed D proportionally to the crop throughput, and only in the extreme regions, such as below a threshing drum rotary speed D1, and above a threshing drum rotary speed D2 to adapt the threshing concave distance A as shown in curve 2.

Besides the different curves I, II shown in FIG. 3, the control can provide also further curves for the different specific corn types and/or for different corn properties, such as for example a ripening degree. The fruit selection can be determined, for example, within a manual of an electronic board information system. When, as in the shown example, only two different adjustment curves are utilized, the corresponding crop type can be associated with the corresponding curve, which also can be provided automatically by an electronic board information system in accordance with a stored classification table or the like.

Another possibility to determine, along which adjusting curve I, II the adjustment is to be performed, is a measurement of the grain separation at constant harvesting conditions, in other words constant crop throughput. The threshing concave distance is then varied by tests during the harvest travel. When the loading of the separating device changes in connection with small changes of the threshing concave distance, the adjusting curve 1 is to be selected, in other cases the adjusting curve II is to be selected.

The invention provides, as a whole, a very fast automatic reaction of the threshing mechanism to temporary throughput changes, without expensive new adjustment of all machine parameters. The special usefulness of the invention is provided especially when restricting crop properties occur only temporarily within the crop stalk. An example for this is a down grain location in the field, at which the grain is flatly pressed against the ground. The crop speed must be reduced during traveling through this region, so that the crop throughput is automatically temporarily lowered. In correspondence with the grain type, then the threshing drum rotary speed and the concave distance are automatically adapted to the crop throughput. When the restrictive down grain location in the field is resolved, and harvesting can be performed in standing stalk, then also fully automatically the optimal threshing drum rotary speed and the optimal threshing concave distance are adjusted, so that without participation of the driver it is possible to operate with the maximum crop throughput at justifiable loss portion.

For safety reasons, the system is designed so that the driver every time during harvesting is in position to overdrive manually individual or all adjusted machine parameters.

It should be finally mentioned that the combine harvester and the control, as well as concrete steps in connection with them are illustrated in the drawings only as an example that a person skilled in the art can very in many ways within the spirit of the present invention. For example, instead of or additionally to the above mentioned sensors, also further sensors can be utilized, for example rotary speed sensors, acceleration sensors and the like. In particular, a speed measuring devices of the combine harvester can be used as further sensor devices, since as a rule the traveling speed is a good indication for the crop throughput.

It will be understood that each of the elements described above, or two or more together, may also find a useful application in other types of methods and constructions differing from the types described above.

While the invention has been illustrated and described as embodied in method of controlling a threshing mechanism of a combine harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of controlling a threshing mechanism of a combine harvester, comprising the steps of adjusting parameters of the threshing mechanism with respect to a nominal crop throughput determined for corresponding harvesting conditions to an optimal value, said adjusting including automatically determining a deviation of an actual crop throughput as an input value at a beginning of a harvesting process from the nominal crop throughput, and adjusting at least one threshing mechanism parameter for adaptation to the actual crop throughput only when the deviation occurs.

2. A method as defined in claim 1, wherein said adjusting includes adjusting the threshing mechanism by adjusting at least one parameter selected from the group consisting of a threshing drum rotary speed, a threshing concave distance, and both, for adaptation to the actual crop throughput.

3. A method as defined in claim 2, wherein said adjusting includes reducing the threshing drum rotary speed with increasing crop throughput.

4. A method as defined in claim 2, wherein said adjusting includes reducing the threshing concave distance with reducing crop throughput.

5. A method as defined in claim 2, wherein said adjusting includes adjusting the threshing concave distance in accordance with a predetermined function depending on an actual threshing drum rotary speed.

6. A method as defined in claim 2, wherein said adjusting includes adjusting the at least parameter selected from the group consisting of the threshing drum rotary speed, threshing concave distance, and both, depending on a crop property.

7. A method as defined in claim 1; and further comprising the measuring the actual crop throughput in a crop feed.

8. A method as defined in claim 1; and further comprising determining a deviation of the actual crop throughput from the nominal crop throughput by measuring a drive parameter selected from the group consisting of a rotary moment on a drive shaft, a driven moment, and both.

9. A method as defined in claim 1; and further comprising determining a deviation of the actual crop throughput from the nominal crop throughput based on a broken corn content.

10. A method as defined in claim 1; and further comprising determining a deviation of the actual crop throughput from the nominal crop throughput based on a loss quantity at a location selected from the group consisting of a rotary moment on a drive shaft, a driven moment, and both.

11. A method as defined in claim 10; and further comprising adjusting the adjustable threshing mechanism parameter automatically to the optimal value back when the actual crop throughput again corresponds to the nominal crop throughput or deviates from the nominal crop throughput by less than a predetermined threshold value.

12. A method as defined in claim 13; and further comprising, after elapsing a predetermined second time period in which the nominal crop throughput is not reached or deviates more than a predetermined threshold value, performing an action selected from the group consisting of automatically performing a new adjustment of further adjustable parameters by different working elements of the combine harvester, suggesting to an operator to adjust these adjustable parameters optimally with respect to the actual crop throughput as a new nominal crop throughput, and both.

13. A method of controlling a threshing mechanism of a combine harvester, comprising the steps of adjusting parameters of the threshing mechanism with respect to a nominal crop throughput determined for corresponding harvesting conditions to an optimal value, said adjusting including automatically determining a deviation of an actual crop throughput as an input value at a beginning of a harvesting process from the nominal crop throughput, and adjusting at least one threshing mechanism parameter for adaptation to the actual crop throughput only when the deviation occurs, wherein said adjusting a threshing mechanism parameter includes performing the adjusting when a situation occurs selected from the group consisting of a deviation of the actual crop throughput by a predetermined threshold value, a deviation of a predetermined first time period, and both from the nominal crop throughput.

14. A combine harvester, comprising a threshing mechanism, and a control device for adjusting parameters of said threshing mechanism with respect to a nominal crop throughput determined for crop conditions to an optimal value, said control device having a crop throughput control unit which automatically recognizes a deviation of an actual crop throughput as an input value at a beginning of a harvesting process from the nominal crop throughput, said control device being formed so that only in the case of such a deviation it adjusts at least one threshing mechanism parameter for adapting to the actual crop throughput.

15. A combine harvester as defined in claim 14; and further comprising a sensor device arranged in a crop feed for determining the actual crop throughput.

16. A combine harvester as defined in claim 14, wherein said sensor device includes a sensor for determining a crop layer height in the crop feed.

17. A combine harvester as defined in claim 14; and further comprising at least one loss quantity sensor arranged at a location selected from the group consisting of an output of a separating device, an output of a cleaning device, and both.

18. A combine harvester as defined in claim 14; and further comprising a broken corn sensing device.

19. A combine harvester as defined in claim 14; and further comprising a measuring device selected from the group consisting of a measuring device for determining a rotary movement on a drive shaft, a measuring device for determining a driven moment of a drive motor, and both.

* * * * *